United States Patent
Jeon et al.

(10) Patent No.: US 7,484,590 B2
(45) Date of Patent: Feb. 3, 2009

(54) FUEL CELL SYSTEM WITH MUFFLER

(75) Inventors: In Youl Jeon, Suwon-si (KR); Sang Hyeon Choi, Suwon-si (KR); Joon Soo Bae, Suwon-si (KR); Min Jung Oh, Suwon-si (KR)

(73) Assignee: Samsung SDI Co., Ltd. (KR)

( * ) Notice: Subject to any disclaimer, the term of this patent is extended or adjusted under 35 U.S.C. 154(b) by 37 days.

(21) Appl. No.: 11/657,847

(22) Filed: Jan. 24, 2007

(65) Prior Publication Data

US 2007/0178352 A1 Aug. 2, 2007

(30) Foreign Application Priority Data

Feb. 2, 2006 (KR) .................. 10-2006-0010296

(51) Int. Cl.
*F01N 7/08* (2006.01)
*F01N 1/00* (2006.01)
*F01N 1/02* (2006.01)
*F01N 1/08* (2006.01)
*F01N 1/12* (2006.01)
*F01N 1/24* (2006.01)

(52) U.S. Cl. .................. 181/227; 181/224; 181/249; 181/253; 181/257; 181/258; 181/268; 181/269; 181/279; 429/13; 429/26; 429/34

(58) Field of Classification Search .......... 181/227, 181/224, 253, 279, 257, 222, 258, 249, 268, 181/269; 429/34, 13, 26
See application file for complete search history.

(56) References Cited

U.S. PATENT DOCUMENTS

| | | | | | |
|---|---|---|---|---|---|
| 1,591,088 | A | * | 7/1926 | Holmes | 181/251 |
| 3,113,635 | A | * | 12/1963 | Allen et al. | 181/252 |
| 3,888,331 | A | * | 6/1975 | Wang | 181/253 |

(Continued)

FOREIGN PATENT DOCUMENTS

FR 602 160 3/1926

(Continued)

OTHER PUBLICATIONS

European Search Report for counterpart EP application No. 07101579.6.

*Primary Examiner*—Walter Benson
*Assistant Examiner*—Christina Russell
(74) *Attorney, Agent, or Firm*—Knobbe Martens Olson & Bear LLP (57) ABSTRACT

A fuel cell system with a muffler to reduce noise generated while supplying air to a fuel cells disclosed. One embodiment of the fuel cell system includes an air feeder to supply air; an electric generator to generate electricity through an electrochemical reaction between air and fuel; and a muffler provided in one end of the air feeder. The muffler includes a first pipe and a second pipe which are different in length from each other. The muffler has a relatively small structure, so that limitation in a mounting space can be decreased and a more compact fuel cell system can be realized. Also, even if there are considerable noise components at two or more frequencies, the mufflers corresponding to the respective frequencies are connected in series, thereby reducing the noise.

21 Claims, 6 Drawing Sheets

U.S. PATENT DOCUMENTS

| | | | | |
|---|---|---|---|---|
| 3,913,703 | A  * | 10/1975 | Parker | 181/206 |
| 4,669,068 | A  * | 5/1987 | Klatt | 367/83 |
| 5,033,581 | A  * | 7/1991 | Feuling | 181/257 |
| 6,633,646 | B1 * | 10/2003 | Hwang | 381/71.5 |
| 6,772,858 | B2 * | 8/2004 | Trochon | 181/224 |
| 6,796,859 | B1 * | 9/2004 | Justen et al. | 440/88 A |
| 6,938,727 | B2 * | 9/2005 | Xia | 181/224 |
| 6,951,697 | B2 * | 10/2005 | Stenersen | 429/12 |
| 2002/0150805 | A1* | 10/2002 | Stenersen et al. | 429/34 |
| 2004/0149515 | A1* | 8/2004 | Toyoshima | 181/258 |
| 2005/0016792 | A1* | 1/2005 | Graefenstein | 181/253 |
| 2005/0268978 | A1* | 12/2005 | Schroeter | 138/103 |
| 2005/0284691 | A1* | 12/2005 | Voss et al. | 181/255 |
| 2006/0027576 | A1* | 2/2006 | Yokozawa | 220/4.12 |
| 2006/0073367 | A1* | 4/2006 | Kanno et al. | 429/24 |
| 2006/0113145 | A1* | 6/2006 | Toyoshima et al. | 181/268 |
| 2006/0201742 | A1* | 9/2006 | Terashima et al. | 181/227 |
| 2006/0292426 | A1* | 12/2006 | Stenersen et al. | 429/34 |
| 2007/0048572 | A1* | 3/2007 | Oglesby et al. | 429/26 |

FOREIGN PATENT DOCUMENTS

| | | |
|---|---|---|
| JP | 2004-185921 | 7/2004 |
| JP | 2004-199971 | 7/2004 |
| KR | 10-1998-0046082 | 9/1998 |
| KR | 10-2000-0015252 | 7/2000 |
| KR | 10-2004-0049211 | 6/2004 |
| WO | WO 03/023884 A2 | 3/2003 |
| WO | WO 03/056223 | 7/2003 |
| WO | WO 2005/091415 | 9/2005 |

* cited by examiner

FUEL CELL SYSTEM WITH MUFFLER

CROSS-REFERENCE TO RELATED APPLICATIONS

This application claims the benefit of Korean Patent Application No. 10-2006-0010296, filed on Feb. 2, 2006, in the Korean Intellectual Property Office, the disclosure of which is incorporated herein by reference.

BACKGROUND

1. Field

The present disclosure relates to a fuel cell system, and more particularly, to a fuel cell system with a muffler to reduce noise occurring from an air feeder.

2. Description of the Related Technology

A fuel cell is a power generation device that transforms chemical energy into electrical energy, using an electrochemical reaction between hydrogen and oxygen. Examples of a fuel cell include a polymer electrolyte membrane fuel cell (PMFC) and a direct methanol fuel cell which operate at a temperature of about 100° C. and below; a phosphate fuel cell operating at a temperate of about 150° C. to about 200° C.; a molten carbonate fuel cell operating at a high temperate of about 600° C. to about 700° C.; a solid oxide fuel cell operating at a high temperate of about 1000° C. and more. These fuel cells operate on the same or similar principle, but use different kinds of fuel, a catalyst, an electrolyte, etc. from one another.

Among these fuel cells, a direct methanol fuel cell (DMFC) operates at a relatively low temperature and employs methanol directly as a fuel without using a reformer for producing hydrogen, and thus it can have a compact structure. The direct methanol fuel cell generates electricity through a chemical reaction between methanol and oxygen. During the operation of the direct methanol fuel cell, air is continuously supplied to the fuel cell to provide oxygen for the reaction.

Other fuel cells generally generate electricity by a chemical reaction between hydrogen and oxygen. During the operation of the fuel cells, air is continuously supplied to the cells because oxygen is needed to operate these fuel cells. In addition, such fuel cells may use a reformer to produce hydrogen. Likewise, air is also continuously supplied to the reformer because the reformer needs oxygen to produce hydrogen.

An air feeder is used to supply air to the fuel cells described above. In general, the air feeder includes a rotary vane pump, a diaphragm pump, or the like. Such a pump supplies air by repetitively compressing and expanding air, and thus generates a periodic or continuous noise. A muffler or silencer can be used for reducing the noise.

SUMMARY

One embodiment provides a fuel cell with a small muffler to reduce noise occurring from an air feeder. Another embodiment provides a fuel cell system comprising: an electric generator configured to generate electricity through an electrochemical reaction between air and fuel; an air feeder configured to supply air to the electric generator, the air feeder comprising an inlet and an outlet; and a muffler in fluid communication with one of the inlet and outlet of the air feeder, the muffler comprising: a first air passageway having a first end and a second end, the first air passageway having a first length extending along the first air passageway between the first and second ends of the first air passageway; and a second air passageway having a first end and a second end, the second air passageway having a second length extending along the second air passageway between the first and second ends of the second air passageway, the first end of the second air passageway being connected to the first end of the first air passageway, the second end of the second air passageway being connected to the second end of the first air passageway, the second length being different from the first length.

The muffler may be connected to the inlet of the air feeder such that air can flow through the muffler to the inlet. The muffler may be connected to the outlet of the air feeder such that air can flow from the air feeder to the electric generator through the muffler. The muffler may be positioned at or near one of the inlet and outlet of the air feeder. The system may further comprise a housing enclosing the muffler and the air feeder.

The air feeder may be configured to generate a noise, wherein a first part of the noise travels through the first air passageway, wherein a second part of the noise travels through the second air passageway, wherein the first and second parts of the noise substantially destructively interfere with each other when the first and second parts of the noise meet at or near the second end of the second air passageway. The first air passageway may have a substantially uniform cross-sectional area along the first air passageway, and the second air passageway may have a substantially uniform cross-sectional area along the second air passageway.

The cross-sectional area of the first air passageway may be substantially the same as that of the second air passageway. The cross-sectional area of the first air passageway may be different from that of the second air passageway. The difference ($\Delta L$) between the first length and the second length may be generally represented by Equation 1:

$$\Delta L = \frac{c(2n+1)}{2fn} \quad \text{Equation 1}$$

wherein c is the speed of sound, and n is an integer greater than or equal to 0; and wherein fn is a frequency component of noise that is to be generated by the air feeder.

The first air passageway may be substantially straight. The second air passageway may helically surround the first air passageway.

The system may further comprise a third air passageway having a first end and a second end, the third air passageway having a third length extending along the third air passageway between the first and second ends of the third air passageway, the first end of the third air passageway being connected to the first end of the first air passageway, the second end of the third air passageway being connected to the second end of the first air passageway, the third length being different from the first length. The third length may be different from the second length.

The system may further comprise: a third air passageway having a first end and a second end, the third air passageway having a third length extending along the third air passageway between the first and second ends of the third air passageway, the first end of the third air passageway being connected to one of the first and second ends of the first air passageway; and a fourth air passageway having a first end and a second end, the fourth air passageway having a fourth length extending along the fourth air passageway between the first and second ends of the fourth air passageway, the first end of the fourth air passageway being connected to the first end of the third air passageway, the second end of the fourth air passageway being connected to the second end of the third air passageway, the fourth length being different from the third length.

The third length may be different from the first length. The fourth length may be different from the second length. The third air passageway may be substantially straight, and the fourth air passageway may helically surround the third air passageway.

At least one of the first and second air passageways may comprise a pipe. The fuel cell system may comprise a direct methanol fuel cell system or polymer electrolyte membrane fuel cell system.

In an exemplary embodiment, a fuel cell system comprises: an air feeder to supply air; an electric generator to generate electricity through an electrochemical reaction between air and fuel; and a muffler provided in one end of the air feeder and comprising a first pipe and a second pipe which are different in length from each other.

Opposite ends of the first pipe are connected to and communicating with opposite ends of the second pipe, and the first pipe and the second pipe have predetermined cross-sectional areas, respectively.

When the length difference between the first pipe and the second pipe is given as ΔL and a frequency corresponding to noise is given as fn, $$fn = \frac{c(2n+1)}{2(\Delta L)}$$

(where, c=the speed of sound, and n=0, 1, 2, 3, . . . ).

The length of the first pipe is shorter than the length of the second pipe, and the first pipe is surrounded by the second pipe, and two or more mufflers are connected in series. Further, the fuel cell system comprises a direct methanol fuel cell system.

BRIEF DESCRIPTION OF THE DRAWINGS

The instant disclosure will become apparent and more readily appreciated from the following description of certain embodiments, taken in conjunction with the accompanying drawings of which.

DETAILED DESCRIPTION

Hereinafter, certain embodiments will be described with reference to accompanying drawings, wherein like reference numerals indicate the same or functionally similar elements. Also, the shape and the size of elements shown in the drawings may be exaggerated for convenience.

Figure 1:
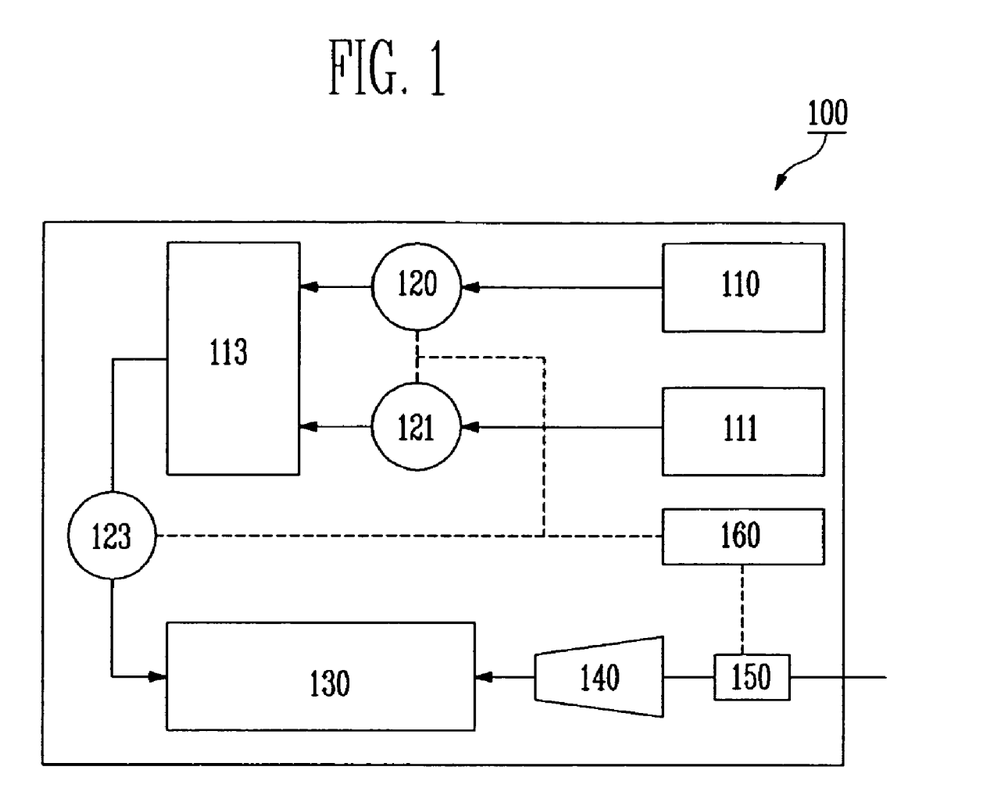
FIG. 1 is a schematic diagram of a direct methanol fuel cell system with a muffler according to one embodiment.

FIG. 1 is a schematic diagram of a direct methanol fuel cell system 100 with a muffler 150 according to one embodiment. Referring to FIG. 1, the direct methanol fuel cell system 100 may include a fuel container 110, a water container 111, a fuel mixer 113, a first fluid pump 120, a second fluid pump 121, a third fluid pump 123, an electric generator 130, an air feeder 140, a muffler 150, and a secondary cell 160.

The fuel container 110 stores fuel such as methanol, and supplies it to the fuel mixer 113 via the first fluid pump 120. The water container 111 stores water and supplies it to the fuel mixer 113 via the second fluid pump 121. The fuel mixer 113 mixes the fuel and water, and supplies a mixture of the fuel and water to the electric generator 130 via the third fluid pump 123.

The air feeder 140 is configured to supply air to the electric generator 130. The air feeder 140 has a first end (or inlet) and a second end (or outlet). The first end is configured to receive air from the muffler 150. The second end is configured to supply the air to the electric generator 130. In the illustrated embodiment, the air feeder 140 inhales air through the first end and exhales it to the electric generator 130 through the second end.

The muffler 150 is configured to reduce noise occurring during the operation of the air feeder 140. The illustrated muffler 150 is positioned near the first end (inlet) of the air feeder 140. In another embodiment, the muffler 150 may be positioned between the air feeder 140 and the electric generator 130. In yet another embodiment, the muffler 150 may be positioned at least partially inside the air feeder 140 at one of the first and second ends of the air feeder 140. The detailed configuration of the muffler 150 will be described below.

The electric generator 130 is configured to generate electric energy through an electrochemical reaction. The electrochemical reactions in the electric generator 130 can be represented by the following Reaction Formula 1.

Anode: $CH_3OH + H_2O \rightarrow CO_2 + 6H^+ + 6e^-$

Cathode: $3/2O_2 + 6H^+ + 6e^- \rightarrow 3H_2O$

Total: $CH_3OH + 3/2O_2 \rightarrow CO_2 + 2H_2O$       Reaction Formula 1

Referring to the above Reaction Formula 1, methanol and water react with each other, producing carbon dioxide, hydrogen ions and electrons at an anode electrode (not shown) of the electric generator 130. The hydrogen ions produced in the anode electrode move to a cathode electrode (not shown) via an electrolyte membrane (not shown), and reacts with oxygen supplied from the cathode electrode, thereby producing water. Further, the electrons produced in the anode electrode move through an external circuit. Here, water and unreacted fuel generated in the electric generator 130 are returned to the fuel mixer 113, using a recovering unit (not shown).

The second cell 160 is configured to supply power for driving the first fluid pump 120, the second fluid pump 121, the third fluid pump 123, and the air feeder 140.

Figure 2:
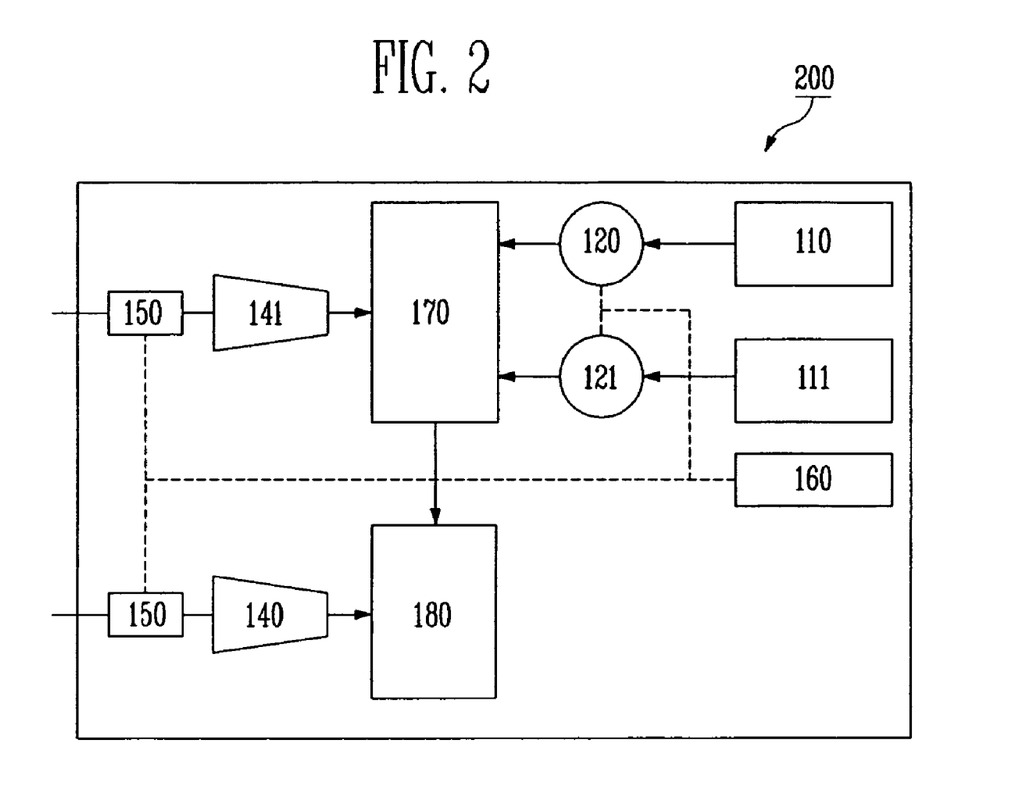
FIG. 2 is a schematic diagram of a polymer electrolyte membrane fuel cell system with a muffler according to another embodiment.

FIG. 2 is a schematic diagram of a polymer electrolyte membrane fuel cell system 200 with a muffler 150 according to another embodiment. The polymer electrolyte membrane fuel cell system 200 includes a fuel container 110, a water container 111, a first fluid pump 120, a second fluid pump 121, a reformer 170, an electric generator 180, air feeders 140 and 141, a muffler 150 and a secondary cell 160. In FIGS. 1 and 2, like reference numerals indicate the same or functionally similar elements, and repetitive descriptions will be omitted.

The reformer 170 may include a reforming reaction unit (not shown) and a carbon monoxide remover (not shown). The reforming reaction unit is configured to reform the fuel to produce a reformed gas containing hydrogen as a chief ingredient. The carbon monoxide (CO) remover is configured to remove carbon monoxide from the reformed gas. The reforming reaction unit converts the fuel into the reformed gas that contains hydrogen through a catalyst reaction such as steam reforming (SR), partial oxidation (POX), auto thermal reforming (ATR), etc. Further, the CO remover removes carbon monoxide from the reformed gas through a catalyst reaction such as water gas shift (WGS), preferential CO oxidation (PROX), etc. Particularly, in the CO remover, the catalyst reaction of the PROX requires oxygen. Some portion of the fuel flows through a heat source (not shown), and the heat source burns the fuel, thereby supplying heat to the reforming reaction unit and the CO remover. At this time, the heat source needs oxygen in burning the fuel.

Oxygen needed for the reformer 170 is supplied by operation of the air feeder 141. In the illustrated embodiment, the first end of the air feeder 141, through which air is introduced, is provided with the muffler 150 to reduce the noise due to the operation of the air feeder 141.

The electric generator 180 generates electricity through an electrochemical reaction between hydrogen supplied from the reformer 170 and oxygen supplied from the air feeder 140. The first end of the air feeder 140 is provided with the muffler 150 to reduce the noise due to the operation of the air feeder 140.

The electrochemical reactions in the electric generator 180 can be represented by the following Reaction Formula 2.

Anode: $H_2 \rightarrow 2H^+ + 2e^-$

Cathode: $1/2 O_2 + 2H^+ + 2e^- \rightarrow H_2O$

Total: $H_2 + 1/2 O_2 \rightarrow H_2O + current + heat.$         Reaction Formula 2

Referring to the above Reaction Formula 2, a hydrogen molecule changes into hydrogen ions and electrons at an anode electrode (not shown) of the electric generator 180. The hydrogen ions produced at the anode electrode move to a cathode electrode (not shown) via an electrolyte membrane (not shown), and react with oxygen at the cathode electrode, thereby producing water. Further, the electrons produced at the anode electrode move along an external circuit. Here, water and unreacted fuel generated in the electric generator 180 are recovered to the water container 111 by a recovering unit (not shown).

The secondary cell 160 is configured to supply power for driving the first fluid pump 120, the second fluid pump 121, and the air feeders 140 and 141. A skilled technologist will appreciate that the muffler can be used with various other configurations of fuel cell systems having an air feeder.

Figure 3:
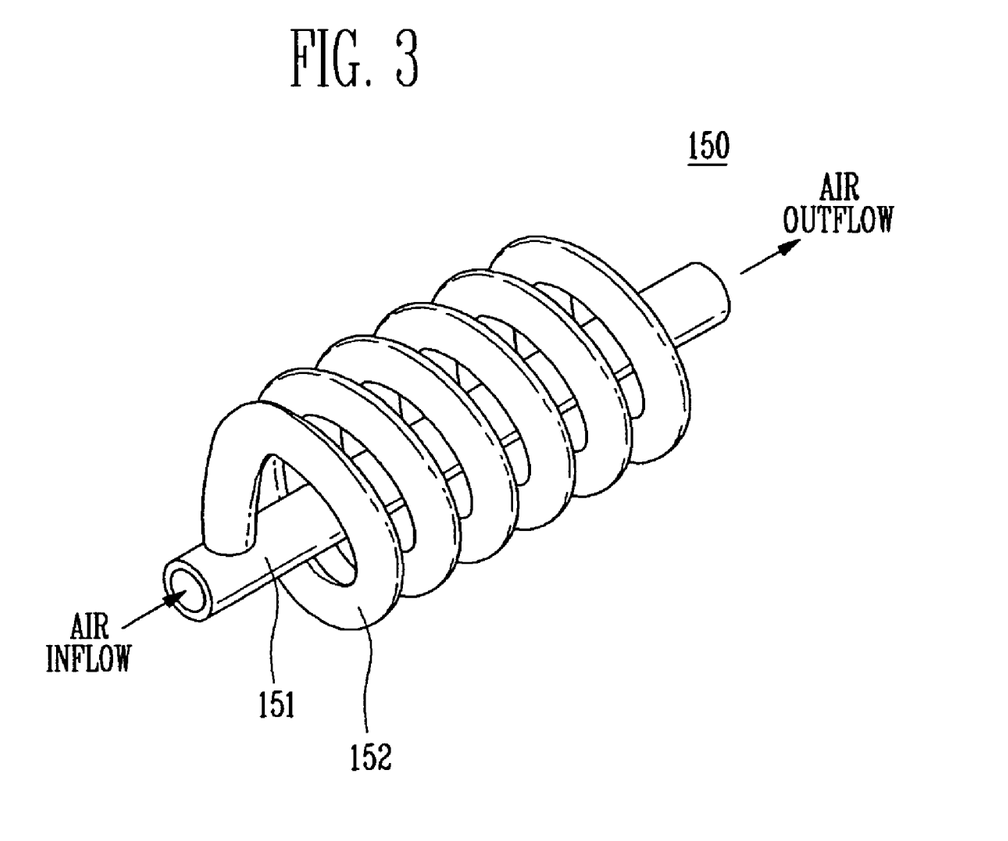
FIG. 3 is a perspective view of a muffler according to one embodiment.
Figure 4:
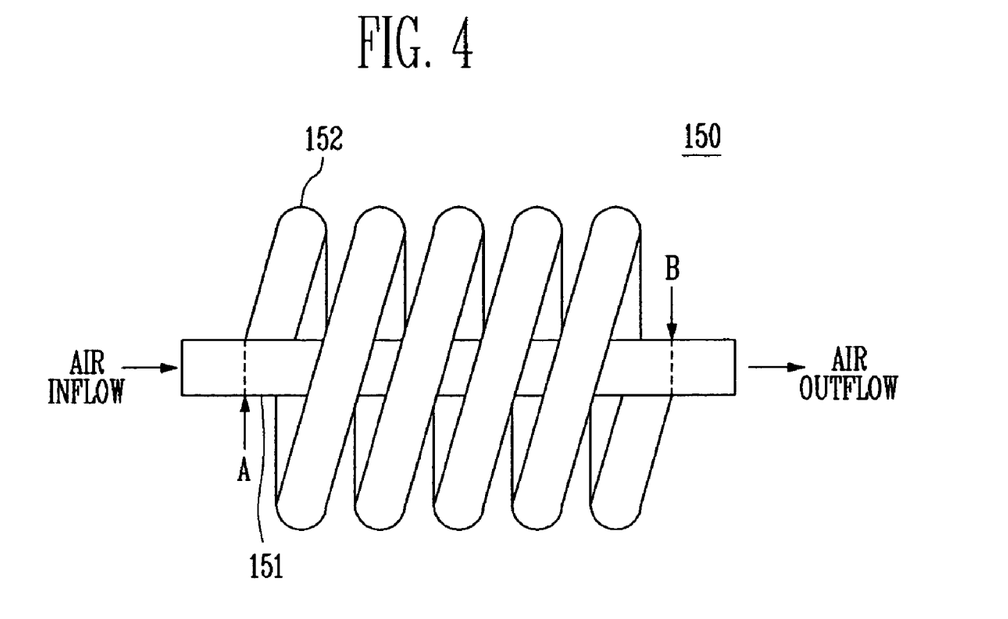
FIG. 4 is a lateral view of the muffler of FIG. 3.

FIG. 3 is a perspective view of a muffler 150 according to one embodiment. Referring to FIGS. 3 and 4, the illustrated muffler 150 includes a hollow straight pipe 151 and a hollow non-straight pipe 152. In other embodiments, the pipes 151, 152 may have various other shapes and configurations. The illustrated non-straight pipe 152 helically surrounds the straight pipe 151. In other embodiments, the non-straight pipe 152 may be arranged in various other configurations with respect to the straight pipe 151. The term "pipe" generally refers to a conduit for conveying a fluid including a gas, a liquid, or a mixture thereof. In addition, the term "pipe" may be interchangeably used with a "duct."

In the illustrated embodiment, the non-straight pipe 152 has a first end and a second end. Both of the first and second ends of the non-straight pipe 152 are connected to the straight pipe 151. The two ends of the non-straight pipe 152 are in air communication with the straight pipe 151. In the illustrated embodiment, the two ends of the non-straight pipe 152 are connected to the end portions of the straight pipe 151. In other embodiments, the two ends of the non-straight pipe 152 may be connected to the straight pipe 151 at portions other than the end portions. This configuration allows part of air entering the muffler 150 to pass through the straight pipe 151 while the remaining part of the air to pass through the non-straight pipe 152.

In the illustrated embodiment, each of the straight pipe 151 and the non-straight pipe 152 has a predetermined cross-sectional area. The cross-sectional areas of the pipes 151, 152 may be substantially uniform along the lengths of the pipes 151, 152. In other embodiments, the cross-sectional areas of the pipes 151, 152 may vary along the pipes 151, 152.

FIG. 4 is a lateral view of the muffler 150 of FIG. 3. In a section between 'A' and 'B' as shown in FIG. 4, the lengths of the straight pipe 151 and the non-straight pipe 152 are L1 and L2, respectively. The length L1 of the straight pipe 151 is shorter than the length L2 of the non-straight pipe 152.

In the muffler 150 according to one embodiment, sound waves traveling through the straight pipe 151 may destructively interfere with sound waves traveling through the non-straight pipe 152. Thus, acoustic energy of noise traveling through the muffler 150 can be attenuated. An acoustic energy ratio between the inlet and the outlet of the muffler 150, i.e., a value of transmission loss (TL), may be varied depending on a frequency bandwidth. The frequency bandwidth may be selected based on the lengths of the pipes as long as the cross-sectional areas of the pipes are uniform. Accordingly, the lengths of the pipes may be adjusted such that the frequency bandwidth of a noise is equal to the frequency bandwidth of the maximum transmission loss.

In the muffler 150, a difference (ΔL) between the lengths of the straight and non-straight pipe 151, 152 can be selected according to Equation 1.

$$\Delta L = L2 - L1 = \frac{c(2n+1)}{2fn} \qquad \text{Equation 1}$$

In Equation 1, a resonance (destructive interference) arises at a frequency fn. c is the speed of sound, and n is an integer equal to or greater than 0 (n=0, 1, 2, 3, . . . ).

If there is a considerable noise component at a certain frequency while operating the air feeder 140, 141 (refer to FIG. 2), the difference between the length L2 of the non-straight pipe 152 and the length L1 of the straight pipe 151 may be adjusted to make resonance occur at the frequency, thereby attenuating the noise component through destructive interference.

For example, if the air feeder 140, 141 (refer to FIG. 2) has a considerable noise component at a frequency of about 300 Hz, the difference between the length L2 of the non-straight pipe 152 and the length L1 of the straight pipe 151 may be determined as follows, thereby attenuating the noise component.

$$L2 - L1 = \frac{343 \times (2n+1)}{2 \times 300} = 0.572 \, \text{m} \, (\text{if } n=0) \qquad \text{Equation 2}$$

In the case that the length difference (L2−L1) between the straight pipe 151 and the non-straight pipe 152 is about 0.572 m, the noise can be effectively reduced also at frequencies of about 900 Hz, about 1500 Hz and so on in addition to 300 Hz.

Figure 5:
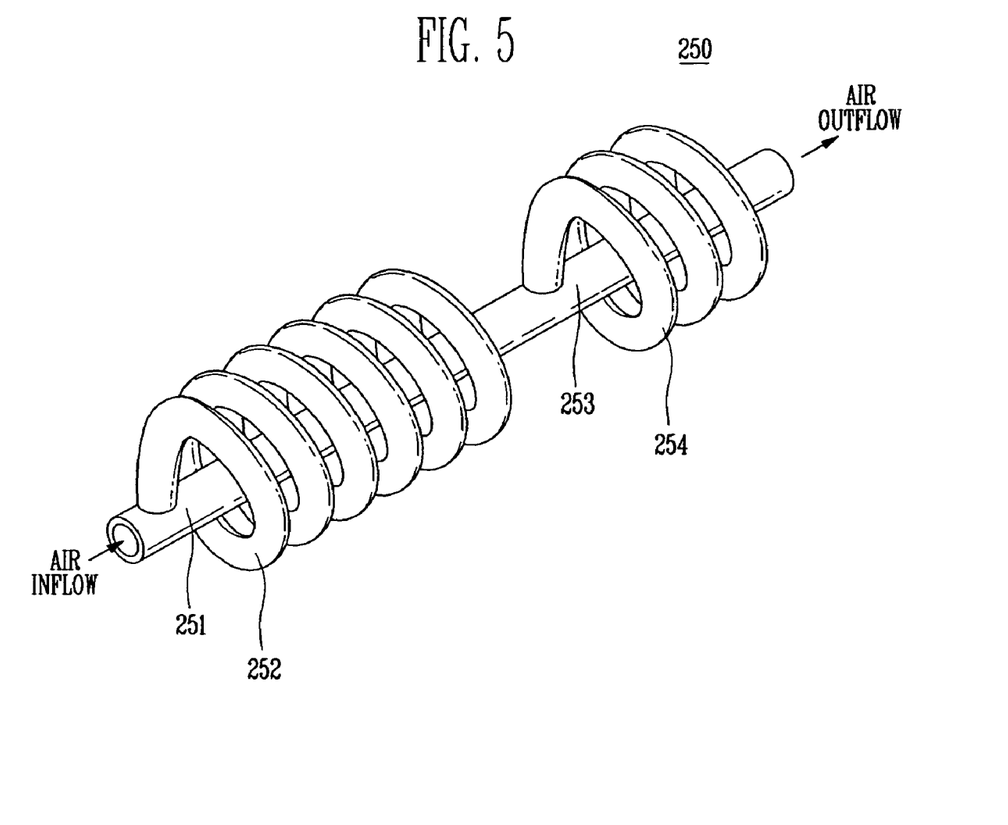
FIG. 5 is a perspective view of a muffler according to another embodiment.
Figure 6:
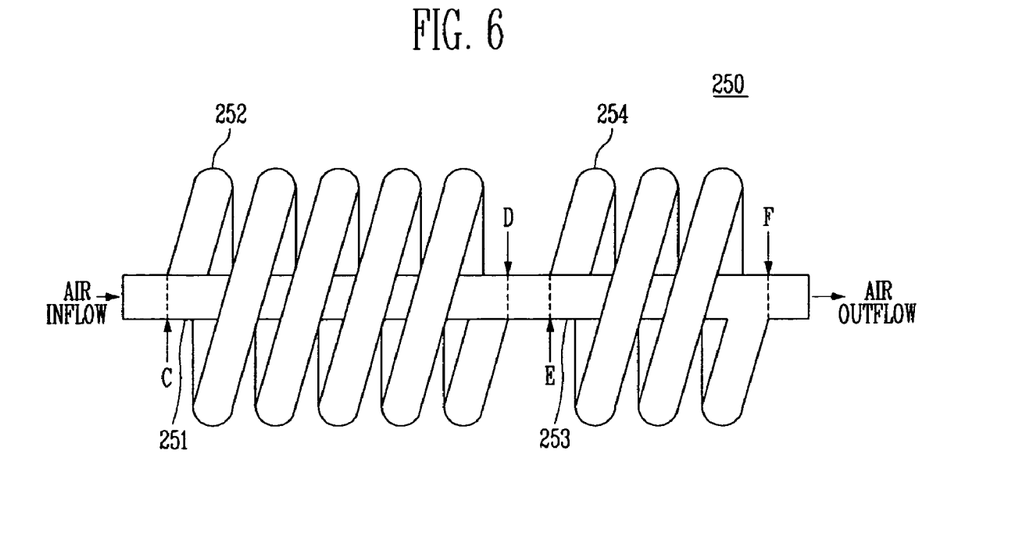
FIG. 6 is a lateral view of the muffler of FIG. 5.

FIG. 5 is a perspective view of a muffler 250 according to another embodiment. FIG. 6 is a lateral view of the muffler 250 of FIG. 5. The muffler 250 includes a first straight pipe 251, a second straight pipe 253, a first non-straight pipe 252 and a second non-straight pipe 254.

The first straight pipe 251 and the first non-straight pipe 252 have predetermined cross-sectional areas, respectively. Further, the cross-sectional areas of the first straight pipe 251 and the first non-straight pipe 252 may be identical with each other.

Within a section between 'C' and 'D' as shown in FIG. 6, the lengths of the first straight pipe 251 and the first non-straight pipe 252 are L3 and L4, respectively. The length L3 of the first straight pipe 251 is shorter than the length L4 of the first non-straight pipe 252. Further, the first straight pipe 251 is helically surrounded by the first non-straight pipe 252. Also, opposite ends of the first straight pipe 251 are connected to and communicating with opposite ends of the first non-straight pipe 252. In other embodiments, the pipes 251, 252 may have various other shapes and configurations.

The second straight pipe 253 and the second non-straight pipe 254 have predetermined cross-sectional areas, respectively. Further, the cross-sectional areas of the second straight pipe 253 and the second non-straight pipe 254 may be identical with each other.

Within a section between 'E' and 'F' as shown in FIG. 6, the lengths of the second straight pipe 253 and the second non-straight pipe 254 are L5 and L6, respectively. The length L5 of the second straight pipe 253 is shorter than the length L6 of the second non-straight pipe 254. Further, the second straight pipe 253 is helically surrounded by the second non-straight pipe 254. Also, opposite ends of the second straight pipe 253 are connected to and communicating with opposite ends of the second non-straight pipe 254. In other embodiments, the pipes 253, 254 may have various other shapes and configurations.

The muffler 250 of FIG. 5 is basically similar to the muffler 150 of FIG. 3. However, the muffler 250 of FIG. 5 can be configured to reduce two noise components if there are considerable noise components at two different frequencies while operating the air feeder 140, 141 (see FIG. 2).

The difference between the length L4 of the first non-straight pipe 252 and the length L3 of the first straight pipe 251 may be adjusted to make resonance occur at one of the two frequencies. In addition, the difference between the length L6 of the second non-straight pipe 254 and the length L5 of the second straight pipe 253 may be adjusted to make resonance occur at the other of the two frequencies, thereby attenuating the noise components through destructive interference.

For example, if the air feeder 140, 141 (refer to FIG. 2) has considerable noise components at frequencies of about 600 Hz and about 900 Hz, the difference between the length L4 of the first non-straight pipe 252 and the length L3 of the first straight pipe 251 may be determined as follows for attenuating the noise component at the frequency of about 600 Hz. The difference between the length L6 of the second non-straight pipe 254 and the length L5 of the second straight pipe 253 may be determined as follows for attenuating the noise component at the frequency of about 900 Hz.

$$L4 - L3 = \frac{343 \times (2n+1)}{2 \times 600} = 0.286 \text{ m (if } n = 0)$$

$$L6 - L5 = \frac{343 \times (2n+1)}{2 \times 900} = 0.191 \text{ m (if } n = 0)$$

In the muffler 250, two sets of the straight and non-straight pipes which are different in length are connected with each other, but not limited thereto. Alternatively, if there are considerable noise components at three or more frequencies while operating the air feeder, several sets of the straight and non-straight pipes can be connected with one another in series, thereby simultaneously attenuating three or more noise components.

In the fuel cell system with the muffler according to the embodiments, it is possible to reduce a noise that is continuously generated due to successive operation of the air feeder. Further, the muffler has a relatively small structure so that limitation in a mounting space can be decreased and a more compact fuel cell system can be realized. Also, even if there are considerable noise components at two or more frequencies, the mufflers connected in series can effectively reduce the noise.

Although a few embodiments have been shown and described, it would be appreciated by those skilled in the art that changes might be made in the embodiments without departing from the principles and spirit of the invention, the scope of which is defined in the claims and their equivalents.

What is claimed is:

1. A fuel cell system comprising:
    an electric generator configured to generate electricity through an electrochemical reaction between air and fuel;
    an air feeder configured to supply air to the electric generator, the air feeder comprising an inlet and an outlet; and
    a muffler in fluid communication with one of the inlet and outlet of the air feeder, the muffler comprising:
        a first air passageway having a first end and a second end, the first air passageway having a first length extending along the first air passageway between the first and second ends of the first air passageway; and
        a second air passageway having a first end and a second end, the second air passageway having a second length extending along the second air passageway between the first and second ends of the second air passageway, the first end of the second air passageway being connected to the first end of the first air passageway, the second end of the second air passageway being connected to the second end of the first air passageway, the second length being different from the first length,
        wherein the second air passageway is spaced apart from the first air passageway between the first and second ends of the first air passageway, and wherein the first length of the first air passageway and second length of the second air passageway are configured such that the muffler resonates at a frequency of noise generated by the air feeder.

2. The system of claim 1, wherein the muffler is connected to the inlet of the air feeder such that air can flow through the muffler to the inlet.

3. The system of claim 1, wherein the muffler is connected to the outlet of the air feeder such that air can flow from the air feeder to the electric generator through the muffler.

4. The system of claim 1, wherein the muffler is positioned at or near one of the inlet and outlet of the air feeder.

5. The system of claim 1, further comprising a housing enclosing the muffler and the air feeder.

6. The system of claim 1, wherein a first part of the noise travels though the first air passageway, wherein a second part of the noise travels through the second air passageway, wherein the first and second parts of the noise substantially destructively interfere with each other when the first and second parts of the noise meet at or near the second end of the second air passageway.

7. The system of claim 1, wherein the first air passageway has a substantially uniform cross-sectional area along the first air passageway, and wherein the second air passageway has a substantially uniform cross-sectional area along the second air passageway.

8. The system of claim 7, wherein the cross-sectional area of the first air passageway is substantially the same as that of the second air passageway.

9. The system of claim 7, wherein the cross-sectional area of the first air passageway is different from that of the second air passageway.

10. The system of claim 1, wherein the difference ($\Delta L$) between the first length and the second length is generally represented by Equation 1:

$$\Delta L = \frac{c(2n+1)}{2fn} \quad \text{Equation 1}$$

wherein c is the speed of sound, and n is an integer greater than or equal to 0; and wherein fn is a frequency component of noise to be removed.

11. The system of claim 1, wherein the first air passageway is substantially straight.

12. The system of claim 1, wherein the second air passageway helically surrounds the first air passageway.

13. The system of claim 1, further comprising a third air passageway having a first end and a second end, the third air passageway having a third length extending along the third air passageway between the first and second ends of the third air passageway, the first end of the third air passageway being connected to the first end of the first air passageway, the second end of the third air passageway being connected to the second end of the first air passageway, the third length being different from the first length.

14. The system of claim 13, wherein the third length is different from the second length.

15. The system of claim 1, further comprising:
a third air passageway having a first end and a second end, the third air passageway having a third length extending along the third air passageway between the first and second ends of the third air passageway, the first end of the third air passageway being connected to one of the first and second ends of the first air passageway; and
a fourth air passageway having a first end and a second end, the fourth air passageway having a fourth length extending along the fourth air passageway between the first and second ends of the fourth air passageway, the first end of the fourth air passageway being connected to the first end of the third air passageway, the second end of the fourth air passageway being connected to the second end of the third air passageway, the fourth length being different from the third length.

16. The system of claim 15, wherein the third length is different from the first length.

17. The system of claim 15, wherein the fourth length is different from the second length.

18. The system of claim 15, wherein the third air passageway is substantially straight, and wherein the fourth air passageway helically surrounds the third air passageway.

19. The system of claim 1, wherein at least one of the first and second air passageways comprises a pipe.

20. The system of claim 1, wherein the fuel cell system comprises a direct methanol fuel cell system or polymer electrolyte membrane fuel cell system.

21. The system of claim 1, wherein two or more mufflers are connected in series.

* * * * *

UNITED STATES PATENT AND TRADEMARK OFFICE
CERTIFICATE OF CORRECTION

PATENT NO. : 7,484,590 B2  Page 1 of 1
APPLICATION NO. : 11/657847
DATED : February 3, 2009
INVENTOR(S) : Jeon et al.

It is certified that error appears in the above-identified patent and that said Letters Patent is hereby corrected as shown below:

On the Title Page (Item 57) Abstract, Line 3, change "cells" to -- cell is --

Column 8, Line 65, in Claim 6, change "though" to -- through --

Signed and Sealed this

Twenty-third Day of June, 2009

JOHN DOLL
*Acting Director of the United States Patent and Trademark Office*